US 6,275,987 B1

(12) United States Patent
Fraley et al.

(10) Patent No.: US 6,275,987 B1
(45) Date of Patent: Aug. 14, 2001

(54) ADAPTIVE, PREDICTIVE PROGRESS INDICATOR

(75) Inventors: Brad James Fraley, Round Rock; Ira H. Schneider, Austin, both of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/187,069

(22) Filed: Nov. 5, 1998

(51) Int. Cl.$^7$ ................................... G06F 9/445
(52) U.S. Cl. ............................. 717/11; 709/102
(58) Field of Search ............. 717/11, 3; 709/102; 703/26; 116/308; 714/46

(56) References Cited

U.S. PATENT DOCUMENTS

| | | | |
|---|---|---|---|
| 3,862,615 | * 1/1975 | Liou ........................ | 116/308 |
| 4,809,170 | * 2/1989 | Leblanc et al. ............ | 717/3 |
| 5,121,494 | * 6/1992 | Dias et al. ................ | 707/2 |
| 5,301,348 | * 4/1994 | Jaaskelainen .............. | 714/46 |
| 5,495,430 | * 2/1996 | Matsunari et al. ......... | 703/6 |
| 5,542,088 | 7/1996 | Jennings, Jr., et al. ..... | 709/103 |
| 5,566,339 | 10/1996 | Perholtz et al. .......... | 713/340 |
| 5,652,876 | * 7/1997 | Ashe et al. ............... | 703/26 |
| 5,657,450 | 8/1997 | Rao et al. ................ | 707/10 |
| 5,953,010 | * 9/1999 | Kampe et al. ............. | 345/348 |
| 5,978,832 | * 11/1999 | Sirkin .................... | 709/107 |
| 6,006,035 | * 12/1999 | Nabahi ................... | 717/11 |
| 6,038,588 | * 3/2000 | Nagarajayya et al. ...... | 709/102 |

OTHER PUBLICATIONS

Hughes, Building a bevy of beans: Create reusable JaveBeans components, JavaWorld, www.javaworld.com/javaworld/jw–09–1997/jw–09–srep.html, Sep. 1997.*

* cited by examiner

Primary Examiner—Mark R. Powell
Assistant Examiner—Hoang-Vu Antony Nguyen-Ba
(74) Attorney, Agent, or Firm—Jeffrey S. LaBaw; Bracewell & Patterson, L.L.P.

(57) ABSTRACT

Completion times for a set of subtasks, which are performed without interaction with a main task managing execution of the subtasks, are estimated. These estimated completion times, together with actual completion times for previously performed subtasks, are employed to determine a time interval at which a progress indicator is incrementally advanced. The progress indicator is then advanced at the calculated rate concurrently with performance of a current subtask. By adjusting for actual completion times of previously completed subtasks, compensation and correction for overestimation or underestimation of subtask completion times allows the progress indicator to adapt appropriately. The advance rate may also be dynamically adjusted to compensate for underestimation of the completion time for a current subtask. The displayed progress indicator thus provides meaningful information to the user regarding the rate and extent of progress despite a lack of progress information exchange between the main task and the subtasks.

21 Claims, 3 Drawing Sheets

ADAPTIVE, PREDICTIVE PROGRESS INDICATOR

BACKGROUND OF THE INVENTION

1. Technical Field

The present invention relates in general to software installation in data processing systems and in particular to progress indicators for software installation. Still more particularly, the present invention relates to displaying a meaningful progress indicator for a software installation program when one or more underlying install routines do not interact with the primary installation program.

2. Description of the Related Art

Installation programs, which load other applications onto a data processing system and perform any necessary setup or configuration changes, are typically written for a specific application. The actual software copying is performed by the installation program, which is aware of which files must be installed and can determine the size of those files. For such installation programs, displaying a progress indicator may be based simply on a determination of how far along the installation process has proceeded or of the size of the files installed versus the total size of all files to be installed.

In some instances, however, an installation program may not directly control the copying of the software from the installation media to the data processing system. Instead, the installation program may perform only some of the actual copying, while invoking other installers to copy specific portions of the software to be installed. This may occur, for instance, when loading "bundled" software onto a new data processing system. This may involve loading an operating system as well as one or more applications from a third party vendor with each application having its own install routine called by the primary installation program.

In such cases, however, the primary installation program may be unaware of the number or total size of files to be copied for a particular application, or of what task the called install routine is currently performing, how far the called install routine has progressed, or how much the called install routine has yet to perform. This makes it challenging for the primary installation program to display a meaningful progress indicator accurately informing the user of how far installation has progressed.

It would be desirable, therefore, to provide a method of displaying a progress indicator for an installation program which does not interact with one or more underlying install routines during installation.

SUMMARY OF THE INVENTION

It is therefore one object of the present invention to provide an improved method and apparatus for software installation in data processing systems.

It is another object of the present invention to provide an improved method and apparatus for displaying progress indicators during software installation in data processing systems.

It is yet another object of the present invention to provide a method and apparatus for displaying a meaningful progress indicator for a software installation program when one or more underlying install routines do not interact with the primary installation program.

The foregoing objects are achieved as is now described. Completion times for a set of subtasks, which are performed without interaction with a main task managing execution of the subtasks, are estimated. These estimated completion times, together with actual completion times for previously performed subtasks, are employed to determine a time interval at which a progress indicator is incrementally advanced. The progress indicator is then advanced at the calculated rate concurrently with performance of a current subtask. By adjusting for actual completion times of previously completed subtasks, compensation and correction for overestimation or underestimation of subtask completion times allows the progress indicator to adapt appropriately. The advance rate may also be dynamically adjusted to compensate for underestimation of the completion time for a current subtask. The displayed progress indicator thus provides meaningful information to the user regarding the rate and extent of progress despite a lack of progress information exchange between the main task and the subtasks.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
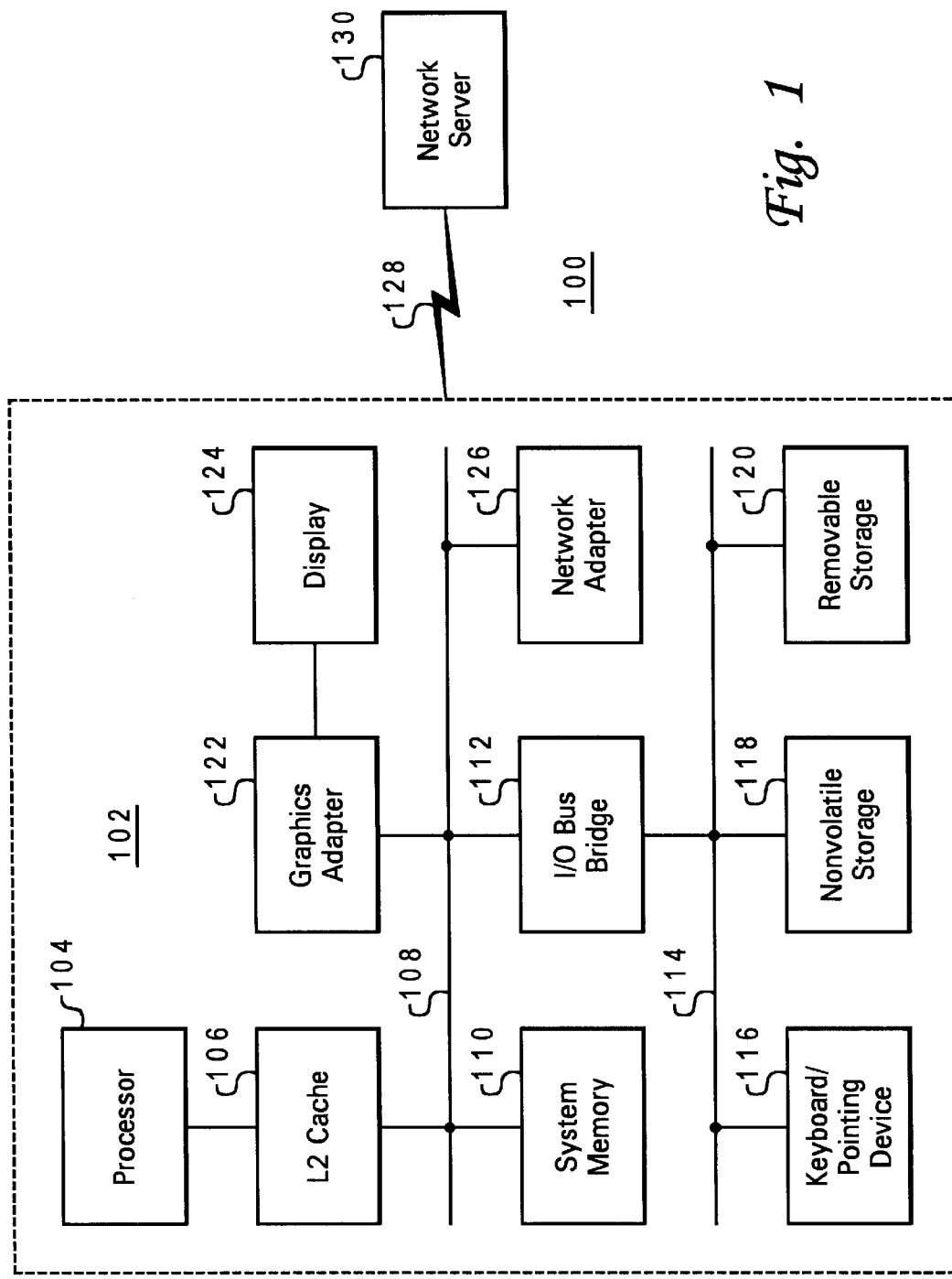
FIG. 1 depicts a block diagram of a data processing system network in which a preferred embodiment of the present invention may be implemented.

With reference now to the figures, and in particular with reference to FIG. 1, a block diagram of a data processing system network in which a preferred embodiment of the present invention may be implemented is depicted. Data processing system network 100 includes a data processing system 102, which may be, for example, one of the Aptiva™ models of personal computers available from International Business Machines Corporation of Armonk, N.Y. Data processing system 102, in turn, includes a processor 104 connected, in the exemplary embodiment, to a level two (L2) cache 106, which is connected in turn to a system bus 108.

Also connected to system bus 108 is system memory 110 and input/output (I/O) bridge 112. I/O bridge 112 couples system bus 108 to I/O bus 114, to which are connected input and storage devices including a keyboard and/or pointing device 116, such as a conventional mouse, trackball, trackpoint, etc., nonvolatile storage 118, such as a hard disk drive, and removable storage 120, such as a floppy disk or CD-ROM drive. In the preferred embodiment, data processing system 102 also includes graphics adapter 122 connected to system bus 108, receiving display data for monitor or display 124. Data processing system 102 further includes a network adapter 126 for connecting data processing system 102 to networks, such as an enterprise local area network (LAN).

Data processing system 102 may be coupled via communications link 128, such as an Ethernet protocol network, to network server 130. Software may be installed in data processing system 102 for storage in nonvolatile storage 118 either from removable storage media accessed through removable storage drive 120 or from network server 130 accessed via communications link 128. Software installation in data processing system 102 employs an installation program and method in accordance with the present invention to display an adaptive, predictive progress indicator as described in further detail below.

The exemplary embodiment shown in FIG. 1 is provided solely for the purposes of explaining the invention and those skilled in the art will recognize that numerous variations of the components depicted and described above are possible, both in form and function, and also that the present invention may be employed with equal benefit in other types of data processing systems. Such variations in which the present invention may be implemented are considered to be within the spirit and scope of the present invention.

Figure 2:
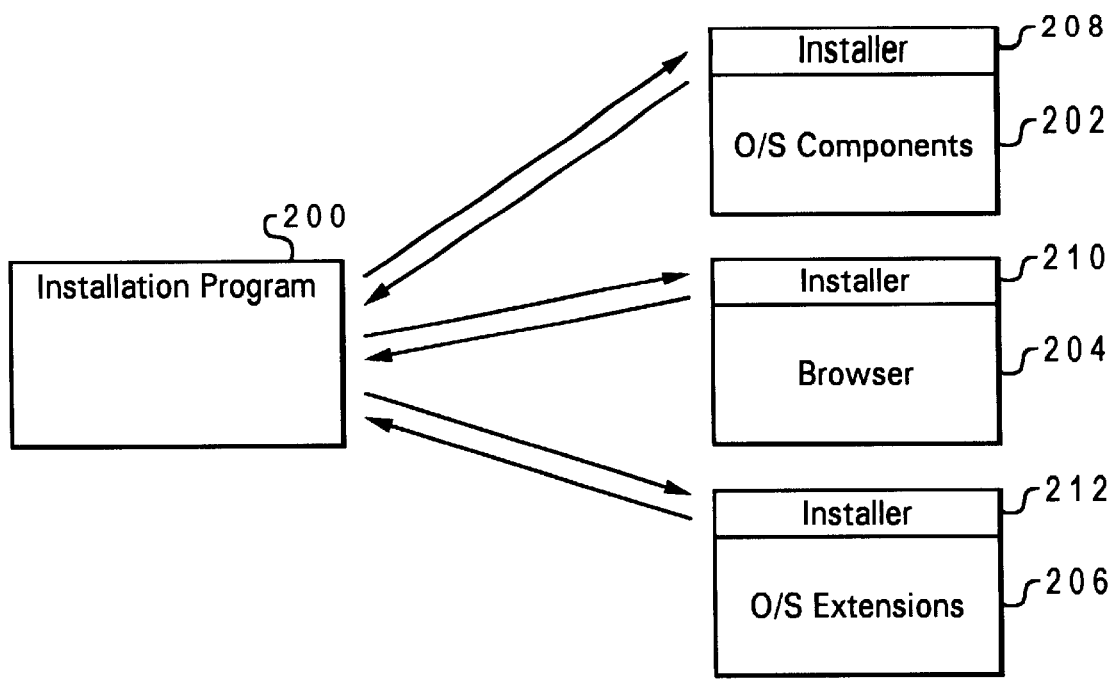
FIG. 2 is a diagram of an installation program employing an adaptive, predictive progress indicator in accordance with a preferred embodiment of the present invention.

With reference now to FIG. 2, a diagram of an installation program employing an adaptive, predictive progress indicator in accordance with a preferred embodiment of the present invention is illustrated. The installation scheme of the present invention employs a main installation program 202 which may or may not perform file copying and installation itself. A plurality of commercial software products 202, 204, and 206, which may originate with different vendors, are to be installed. Each software product 202, 204, and 206 has its own, associated installer 208, 210, and 212, respectively, for performing the file copying and configuration settings necessary to place the software in operating condition within a data processing system.

Main installation program 200 calls each of installers 208, 210 and 212 in turn for installation of software products 202, 204, and 206. Other than a call to and a return from the installers, however, main installation program 200 does not interact with installer 208, 210, or 212 during installation of a corresponding software product 202, 204, or 206. Main installation program 200 is also unable to determine the number or size of files which must be installed for software product 202, 204, or 206, or the point of installation to which installer 208, 210, or 212 has progressed at any given time.

In order to provide meaningful progress information to the user without rewriting main installation program 200 to perform all of the tasks which would otherwise be performed by installers 208, 210, and 212, an estimate of the "normal" time required for each task initiated by main installation program 200 is obtained. The estimate may be obtained by timing the performance of each task on various types of data processing systems expected to be utilized during installation. If desired, an array of time estimates may be formulated for different processors, bus architectures, and storage media.

Figure 3:
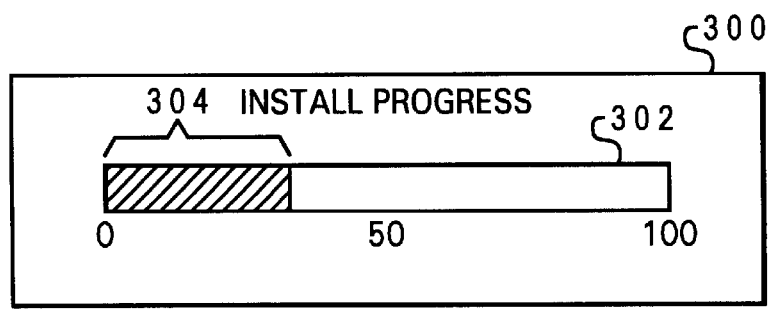
FIG. 3 depicts a user interface progress indicator which may be employed for displaying an adaptive, predictive progress indication in accordance with a preferred embodiment of the present invention.

With reference now to FIG. 3, a user interface progress indicator which may be employed for displaying an adaptive, predictive progress indication in accordance with a preferred embodiment of the present invention is depicted. Progress indicator 300 includes a bar 302 having a differently colored or shaded portion 304 corresponding to the percentage of the installation which has been complete. In the exemplary embodiment, shaded portion 304 advances in increments of 1% under the control of a timer as described in further detail below until the entire installation is complete, at which time shaded portion 304 fills bar 302.

Referring back to FIG. 2, the progress indicator of the present invention should run on a thread which is independent of installers 208, 210, and 212. To display the indicator, the cumulative time estimate for all tasks to be performed is first calculated. Then, for each task, the following step are performed during execution of the task:

a) Calculate an adjustment factor by dividing the total actual time used for previous task(s) by the accumulated time estimate for those tasks. The adjustment factor is 1 for the first task, and is not allowed to be less than 0.5 for any other task.
b) Add the task's estimated time to the accumulated time.
c) Calculate an adjusted estimated time for the task by multiplying the task's estimated time by the adjustment factor.
d) Calculate the limit percentage value beyond which the progress indicator is not permitted to advance for this task by dividing the (incremented) accumulated time by the total estimated time.
e) Calculate the time interval for a 1% advance of the visual progress indicator by dividing the adjusted estimated time for this task by the difference between the limit percentage and the current percentage. Save the current percentage as the starting percentage for this task.
f) Every time the timer signals the end of an interval, add the interval time to the total actual time and advance the visual progress indicator by 1%. If the current percentage value is more than 75% of the distance between the starting percentage for this task and the limit percentage, add 10% to the time interval originally calculated for a 1% progress indicator advance. This will cause the progress indicator to slow down. If the current percentage value is more than 95% of the distance between the starting percentage for this task and the limit percentage, double the originally calculated time interval for indicating a 1% progress advance. This will cause the progress indicator to slow down drastically if the time required for the task was severely underestimated.

When all "real" tasks are completed, calculate the time interval required to advance the progress indicator to 100% by dividing the number of seconds allocated for this "fictitious" task by the difference between 100 and the currently displayed percentage. Limit the final time interval to 0.5 seconds.

As a specific example, supposed four tasks must be performed for an installation:

1. Stop a network services routine—time estimate: 30 seconds.
2. Install O/S components—time estimate: 4 minutes.
3. Install a browser—time estimate: 2 minutes.
4. Install O/S extensions—time estimate: 30 seconds. The total estimated time for completing all four tasks is 7 minutes, or 420 seconds.

Each task is then processed in sequence. The process of task 1—stopping a network services routine—was estimated to require 30 seconds. The adjustment factor is 1 since this is the first task. The accumulated time, which is the previous accumulated time (0) plus the time estimate for task 1, is 30 seconds. The adjusted estimated time for task 1 (the time estimate times the adjustment factor) is 30 seconds. The limit percentage of task 1, which is the accumulated time (30 seconds) divided by the total estimated time for all tasks (420 seconds) is approximately 7%. The starting percentage for the progress indicator display is 0%, and the time interval—the adjusted estimated time divided by the difference between the limit percentage and the current percentage, or (30/(7−0))—is 4.3 seconds.

The timer is started, together with the task, which in the exemplary embodiment is directly performed by installation program 200. Every time the timer signals the progress indicator (every 4.3 seconds for task 1), the progress indicator is visually advanced by 1% and 4.3 seconds is added to the actual time taken. Assuming that the time for task 1 was overestimated and only 20 seconds were required to stop the network services routine, the progress indicator will advance to only about 5%.

Task 2—installing operating system components 202, with an estimated completion time of 240 seconds—is then started by installation program 200 with a call to installer 208. The adjustment factor, which is the actual time taken for previous tasks divided by the estimated time taken for those tasks, is 0.67 (20/30). The accumulated time is increased by the estimated time for task 2 to 270 seconds, and the adjusted estimated time for task 2 is calculated to be 161 seconds (240*0.67).

The task 2 limit percentage—accumulated time divided by total estimated time—is 64% (370/420), while the starting percentage is 5%. The timer interval for task 2 is 2.7 seconds (161/(64−5)). For each timer signal received (every 2.3 seconds), the progress indicator is advanced by 1% and 2.7 seconds are added to the actual time taken. When the progress indicator reaches 49% (5+0.75*(64−5)), the timer interval is increased by 0.27 seconds to 3.0 seconds, when rounded, to slow down the visual movement of the progress indicator. When installer 208 is finished installing operating system components 202, it returns control over the installation process to main installation program 200.

Assuming the time required for task 2 was again overestimated and installation of operating system components 202 required only 200 seconds, the total actual time is 220 seconds (20 seconds for task 1 and 200 seconds for task 2). However, the progress indicator advanced all the way to 64% since only 161 seconds were allocated for task 2 and 200 seconds were required.

Once control is returned to main installation program 200 by installer 208 upon completion of task 2, main installation program 200 calls installer 210 for task 3, installation of a browser. The progress indicator computations are again repeated, resulting in an adjustment factor of 0.81 (220/270). Note that the total time is still assumed to be overestimated by this adjustment factor, but by a lower percentage than was computed for task 2.

The accumulated time for task 3 becomes 390 (270+120), while the adjusted estimated time for task 3 is 97 seconds (120*0.81) and the limit percentage in 93% (390/420). The starting percentage is 64%, with the timer interval calculated at 3.3 seconds (97/(93−64)). Upon each expiration of the timer interval, the progress indicator advances by 1% and 3.3 seconds are added to the actual time. When the progress indicator reaches 86% (64+0.75*(93−64)), the timer interval is increased by 0.33 second to slow the visual movement of the progress indicator.

If the time required for task 3 was underestimated such that 130 seconds were actually required, the total actual time becomes 350 seconds, with the progress indicator advancing all the way to 93%. Upon return of control from installer 210 to main installation program 200, installer 212 is called to perform task 4—installation of operating system extensions 206—and the progress indicator calculations are updated. The adjustment factor becomes 0.90 (350/390), indicating that the actual installation time is getting closer to the projected installation time.

The accumulated time increases to 420, the total estimated time, while the adjusted estimated time for task 4 becomes 27 seconds (30*0.90). The limit percentage for task 4 is 100% (420/420), with a starting percentage of 93% for a timer interval, for task 4, of 3.9 seconds (27/(100−93)). For each 3.9 second period which elapses during installation of operating system extensions 206, the visual progress indicator is advanced 1% and the actual time taken is incremented by 3.9 seconds.

If the progress indicator reaches 98% (93+0.75*(100−93)) during task 4, the timer interval is increased by 0.39 seconds to slow down the movement of the progress indicator. However, assuming that installation of operating system extensions 206 only requires 15 seconds, the progress indicator never reaches 98% and the timer interval need not be increased. For that case, the progress indicator only reaches 97%, and the total time taken is 365 seconds (20 seconds for task 1,200 seconds for task 2,130 seconds for task 3, and 15 seconds for task 4).

Once control is returned by installer 212 to main installation program 200 upon completion of task 4, the progress indicator is advanced to 100%. Assuming 5 seconds were allowed for this "fictitious" task in which the progress indicator is advanced, the timer interval for this last step is 1.7 seconds: time allowed/(100−starting percentage), or 5/(100−97). In order not to waste the users time, however, the timer interval is limited to 0.5 seconds; each time 0.5 seconds elapses, the progress indicator is advanced by one percent, requiring 1.5 seconds for the progress indicator to reach 100% in this example.

Although described in the exemplary embodiment as relating to software installation, the adaptive, predictive progress indicator of the present invention may be employed in other circumstances. For instance, the adaptive, predictive progress indicator of the present invention may be employed for distributed computing applications for which distributed portions have been previously profiled to estimate time for different distributed process segments which produce some feedback for the main process. The main process may provide meaningful progress information based on feedback with the present invention. Additionally, although specific calculations are described herein, those skilled in the art will recognize that numerous variants exist for adjusting the advance rate of a progress indicator to accommodate variance from estimated completion times.

Figure 4:
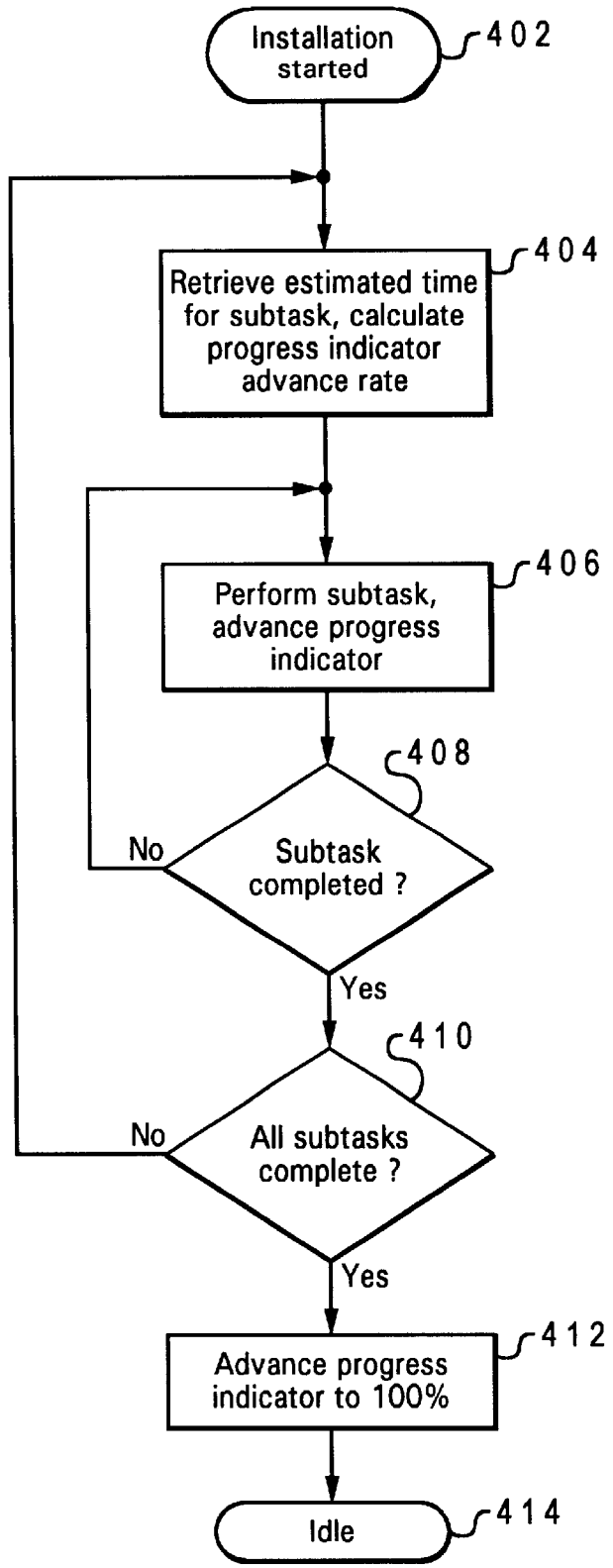
FIG. 4 is a high level flowchart for a process of displaying an adaptive, predictive progress indicator in accordance with a preferred embodiment of the present invention.

Referring to FIG. 4, a high level flowchart for a process of displaying an adaptive, predictive progress indicator in accordance with a preferred embodiment of the present invention is illustrated. The process begins at step 402, which depicts starting a task including a plurality of subtasks, where execution of the subtasks is not interactive with performance of the main task. Software installation where portions of the software is installed by independent installation routines is an example. In the present invention, however, an estimated time for completion of each subtask is assumed to be available.

The process then passes to step 404, which illustrates retrieving an estimated time required for a subtask to be completed ($T_n$), where the subject subtask n is the first subtask at this point in the process, and calculating a progress indicator advance rate. The progress indicator advance rate is calculated by first computing an adjustment factor (AF) based on performance of the previous subtasks within the main task.

For the first task, the adjustment factor is simply set to 1; however, for subsequent subtasks, the adjustment factor is determined by:

$$AF = \frac{\sum_{i=1}^{n-1} AT_i}{\sum_{i=1}^{n-1} ET_i}$$

where $AT_i$ is the actual time required to complete a previous subtask i and $ET_i$ is the estimated time required to complete that same previous subtask i. The adjusted estimated time ($ET_n'$) required to complete the subject subtask n may then be determined from the product of the adjustment factor AF and the originally estimated time $ET_n$ for the subject task (that is, $ET_n'=AF*ET_n$)

The accumulated estimated time (AET) for performing subtasks within the main task up to and including the subject subtask n is then computed from:

$$AET = \sum_{i=1}^{n} ET_i$$

where $ET_i$ is again the estimated time required to complete a subtask i. The accumulated estimated time may be calculated simply by adding the estimated time to complete the subject subtask n, $ET_n$, to the adjusted estimated time previously calculated for the immediately preceding subtask (where the previously calculated adjusted estimated time is zero for the first subtask).

The limit percentage (LP) for the current subtask in calculated from the accumulated estimated time AET divided by the total estimated time $T_{total}$, which is sum of the estimated times for all subtasks within the main task:

$$LP = \frac{AET}{T_{total}} = \frac{\sum_{i=1}^{n} ET_i}{\sum_{i=1}^{k} ET_i}$$

where k is the total number of subtasks within the main task. The progress indicator will not be permitted to advance past the limit percentage (LP) for the subject subtask n. The starting percentage (SP) is the current percentage level of the progress indicator at the beginning of the subject subtask n, which is zero for the first subtask and, for each subsequent subtask, is the ending percentage for an immediately preceding subtask.

Finally, the progress indicator advance rate (R) is the period which must elapse for the progress indicator to advance by a predetermined increment (1% in the exemplary embodiment). The progress indicator advance rate (R) is determined from:

$$R = \frac{ET_n'}{LP - SP}$$

where progress indicator advance rate R is expressed in units of time (e.g., seconds).

The process next passes to step 406, which depicts performing the current subtask and concurrently advancing the progress indicator at the calculated progress indicator advance rate. As described above, movement of the progress indicator may be slowed by increasing the advance rate to 110% of the calculated value R once the progress indicator has advanced 75% of the distance between the starting percentage SP and the limit percentage LP. The progress indicator movement may further be slowed by doubling the calculated advance rate R once the progress indicator has covered 95% of the distance between the starting percentage and the limit percentage. This adjustment accommodates variances from the estimated completion times for a given subtask.

The process then passes to step 408, which illustrates a determination of whether the current subtask is complete. If not, the process returns to step 406 to continue performing the current subtask and advancing the progress indicator at the calculated time interval rate as described above. If so, however, the process instead proceeds to step 410, which depicts a determination of whether all subtasks within the main task are complete. If not, the process returns to step 404 to retrieve an estimated completion time for the next subtask, calculate a progress indicator advance rate for that subtask, and begin performing the next subtask while advancing the progress indicator at a corresponding rate.

Once all subtasks within the main task are complete, the process proceeds from step 410 to step 412, which illustrates advancing the progress indicator to 100% as described in the above example. The process then passes to step 414, which depicts the process becoming idle until another task including independently-performed subtasks is started.

The present invention allows meaningful progress information to be displayed for a task involving a number of subtasks which progress without interaction with the main task. Completion times for each subtask are estimated. The progress indicator is advanced concurrently with the performance of each subtask at a corresponding calculated advance rate, with adjustments being made for each subtask to correct for over or underestimation of actual completion times. The resulting, single progress indicator for a set of diverse tasks is reasonably accurate and provides the user with feedback regarding the rate and extent of progress for all tasks.

It is important to note that while the present invention has been described in the context of a fully functional data processing system and/or network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of indicating the progress of a task including a sequence of subtasks performed without progress information feedback to the task, comprising:

calculating a time estimate for performing the task utilizing time estimates for completing each subtask;

responsive to starting the task, displaying a progress indicator advanced at a rate based on the calculated time estimate;

responsive to completion of a previous subtask and initiation of a current subtask, comparing an actual completion time to an estimated completion time for all completed subtasks; and adjusting an advance rate for the progress indicator for the current subtask according to the results of the comparing step.

2. The method of claim 1, wherein the task is installation of computer software and each of the subtasks is installation of a component of the computer software with a separate installation program.

3. The method of claim 1, wherein the step of adjusting an advance rate for the progress indicator according to the results of the comparing step further comprises:

speeding up or slowing down the advance rate of the progress indicator.

4. The method of claim 1, wherein the step of displaying a progress indicator advanced at a rate based on the calculated time estimate further comprises:

advancing the displayed progress indicator at a rate adjusted for a ratio of the actual completion time to the estimated completion for the completed subtasks.

5. The method of claim 1, wherein the step of displaying a progress indicator advanced at a rate based on the calculated time estimate further comprises:

advancing the displayed progress indicator at a rate equal to an adjusted estimated time for completion of the current subtask divided by a difference between a limit percentage and a current percentage for the progress indicator.

6. The method of claim 1, wherein the step of comparing an actual completion time to an estimated completion time for all completed subtasks further comprises:

calculating a ratio of the actual completion time for all completed subtasks to the estimated completion time for all completed subtasks.

7. The method of claim 6, wherein the step of adjusting an advance rate for the progress indicator for the current subtask according to the results of the comparing step further comprises:

adjusting the advance rate to a rate equal to
an estimated completion time for the current subtask times
the ratio of the actual completion time for all completed subtasks to the estimated completion time for all completed subtaks divided by
the difference between a limit percentage and a starting percentage for the current subtask.

8. A system for indicating the progress of a task including a sequence of subtasks performed without progress information feedback to the task, comprising:

means for calculating a time estimate for performing the task utilizing time estimates for completing each subtask;

means, responsive to starting the task, for displaying a progress indicator advanced at a rate based on the calculated time estimate;

means, responsive to completion of a previous subtask and initiation of a current subtask, for comparing an actual completion time to an estimated completion time for all completed subtasks; and means for adjusting an advance rate for the progress indicator for the current subtask according to the results of the comparing step.

9. The system of claim 8, wherein the task is installation of computer software and each of the subtasks is installation of a component of the computer software with a separate installation program.

10. The system of claim 8, wherein the means for adjusting an advance rate for the progress indicator according to the results of the comparing step further comprises:

means for speeding up or slowing down the advance rate of the progress indicator.

11. The system of claim 8, wherein the means for displaying a progress indicator advanced at a rate based on the calculated time estimate further comprises:

means for advancing the displayed progress indicator at a rate adjusted for a ratio of the actual completion time to the estimated completion time for the completed subtasks.

12. The system of claim 8, wherein the means for displaying a progress indicator advanced at a rate based on the calculated time estimate further comprises:

means for advancing the displayed progress indicator at a rate equal to an adjusted estimated time for completion of the current subtask divided by a difference between a limit percentage and a current percentage for the progress indicator.

13. The system of claim 8, wherein the means for comparing an actual completion time to an estimated completion time for all completed subtasks further comprises:

means for calculating a ratio of the actual completion time for all completed subtasks to the estimated completion time for all completed subtasks.

14. The system of claim 13, wherein the means for adjusting an advance rate for the progress indicator for the current subtask according to the results of the comparing step further comprises:

means for adjusting the advance rate to a rate equal to an estimated completion time for the current subtask times
the ratio of the actual completion time for all completed subtasks to the estimated completion time for all completed subtaks divided by
the difference between a limit percentage and a starting percentage for the current subtask.

15. A computer program product within a computer usable medium, comprising:

instructions for calculating a time estimate for performing a task including a sequence of subtasks performed without progress information feedback to the task;

instructions, responsive to starting the task, for displaying a progress indicator advanced at a rate based on the calculated time estimate;

instructions, responsive to completion of a previous subtask and initiation of a current subtask, for comparing an actual completion time to an estimated completion time for all completed subtasks; and instructions for adjusting an advance rate for the progress indicator for the current subtask according to the results of the comparing step.

16. The computer program product of claim 15, wherein the task is installation of computer software and each of the subtasks is installation of a component of the computer software with a separate installation program.

17. The computer program product of claim 15, wherein the instructions for adjusting an advance rate for the progress indicator according to the results of the comparing step further comprises:

instructions for speeding up or slowing down the advance rate of the progress indicator.

18. The computer program product of claim 15, wherein the instructions for displaying a progress indicator advanced at a rate based on the calculated time estimate further comprises:

instructions for advancing the displayed progress indicator at a rate adjusted for a ratio of the actual completion time to the estimated completion time for the completed subtasks.

19. The computer program product of claim 15, wherein the instructions for displaying a progress indicator advanced at a rate based on the calculated time estimate further comprises:

instructions for advancing the displayed progress indicator at a rate equal to an adjusted estimated time for completion of the current subtask divided by a difference between a limit percentage and a current percentage for the progress indicator.

20. The computer program product of claim 15, wherein the instructions for comparing an actual completion time to an estimated completion time for all completed subtasks further comprises:

instructions for calculating a ratio of the actual completion time for all completed subtasks to the estimated completion time for all completed subtasks.

21. The computer program product of claim 20, wherein the instructions for adjusting an advance rate for the progress indicator for the current subtask according to the results of the comparing step further comprises:

instructions for setting the advance rate to a rate equal to an estimated completion time for the current subtask times the ratio of the actual completion time for all completed subtasks to the estimated completion time for all completed subtaks divided by the difference between a limit percentage and a starting percentage for the current subtask.

\* \* \* \* \*